United States Patent
Glover

(10) Patent No.: US 10,353,976 B2
(45) Date of Patent: Jul. 16, 2019

(54) GENERATING SEARCH RESULTS USING A SET OF ALTERNATE SEARCH QUERIES

(71) Applicant: Samsung Electronics Co., Ltd., Suwon-si, Gyeonggi-do (KR)

(72) Inventor: Eric J. Glover, Palo Alto, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 738 days.

(21) Appl. No.: 14/874,982

(22) Filed: Oct. 5, 2015

(65) Prior Publication Data

US 2017/0097936 A1   Apr. 6, 2017

(51) Int. Cl.
*G06F 7/00* (2006.01)
*G06F 17/30* (2006.01)
*G06F 16/9537* (2019.01)
*G06F 16/242* (2019.01)

(52) U.S. Cl.
CPC ...... *G06F 16/9537* (2019.01); *G06F 16/2425* (2019.01)

(58) Field of Classification Search
CPC ........... G06F 17/3087; G06F 17/30395; G06F 17/30339
USPC ........................................................ 707/709
See application file for complete search history.

(56) References Cited

U.S. PATENT DOCUMENTS

| 9,116,918 | B1* | 8/2015 | Kim ................... G06F 16/2454 |
| 2007/0027866 | A1* | 2/2007 | Schmidt-Karaca ..... G06F 16/14 |
| 2007/0027899 | A1* | 2/2007 | Elbrader ................ G06Q 10/10 |
| 2011/0167077 | A1* | 7/2011 | Govani ............... G06F 16/9537 707/767 |
| 2011/0231347 | A1* | 9/2011 | Xu ........................ G06F 16/951 706/12 |
| 2012/0095996 | A1* | 4/2012 | Dumant ............ G06F 16/24575 707/728 |
| 2012/0284247 | A1* | 11/2012 | Jiang .................. G06F 16/9535 707/706 |
| 2012/0317088 | A1* | 12/2012 | Pantel .................. G06F 16/972 707/706 |
| 2013/0173639 | A1* | 7/2013 | Chandra ............... G06F 16/951 707/754 |
| 2013/0290319 | A1* | 10/2013 | Glover .............. G06F 16/24578 707/723 |
| 2014/0201681 | A1* | 7/2014 | Mahaffey .......... H04M 1/72569 715/846 |

(Continued)

*Primary Examiner* — Binh V Ho
(74) *Attorney, Agent, or Firm* — Jefferson IP Law, LLP

(57) ABSTRACT

A method includes receiving a search query containing one or more query terms from a remote device and identifying an entity in the search query. The entity is a known entity name of a known entity type. The method also includes determining a set of alternate search queries based on the identified entity. The alternate search queries are configured to identify states of software applications that correspond to entities that are substitutes for the identified entity. The method also includes identifying a consideration set of application state records stored in an application state data store based on the alternate set of search queries. Each application state record defines a state of a respective software application that is at least relevant to one or more of the alternate search queries. The method also includes generating search results based on the consideration set and transmitting the search results to the remote device.

17 Claims, 8 Drawing Sheets

(56) References Cited

U.S. PATENT DOCUMENTS

| | | | |
|---|---|---|---|
| 2014/0214898 A1* | 7/2014 | Shapira | H04L 67/02 |
| | | | 707/771 |
| 2014/0250106 A1* | 9/2014 | Shapira | G06F 3/04842 |
| | | | 707/722 |
| 2014/0250147 A1* | 9/2014 | Shapira | G06F 3/04842 |
| | | | 707/770 |
| 2014/0316890 A1* | 10/2014 | Kagan | G06Q 30/0256 |
| | | | 705/14.54 |
| 2014/0358913 A1* | 12/2014 | Cai | G06F 16/90348 |
| | | | 707/728 |
| 2015/0081660 A1* | 3/2015 | Margulis | G06F 16/9535 |
| | | | 707/706 |
| 2015/0227588 A1* | 8/2015 | Shapira | G06F 16/9535 |
| | | | 707/722 |
| 2015/0269231 A1* | 9/2015 | Huynh | G06F 16/951 |
| | | | 707/722 |
| 2016/0154856 A1* | 6/2016 | Olof-Ors | G06F 16/24578 |
| | | | 707/728 |
| 2016/0180249 A1* | 6/2016 | Britt | G06N 20/00 |
| | | | 706/12 |

* cited by examiner

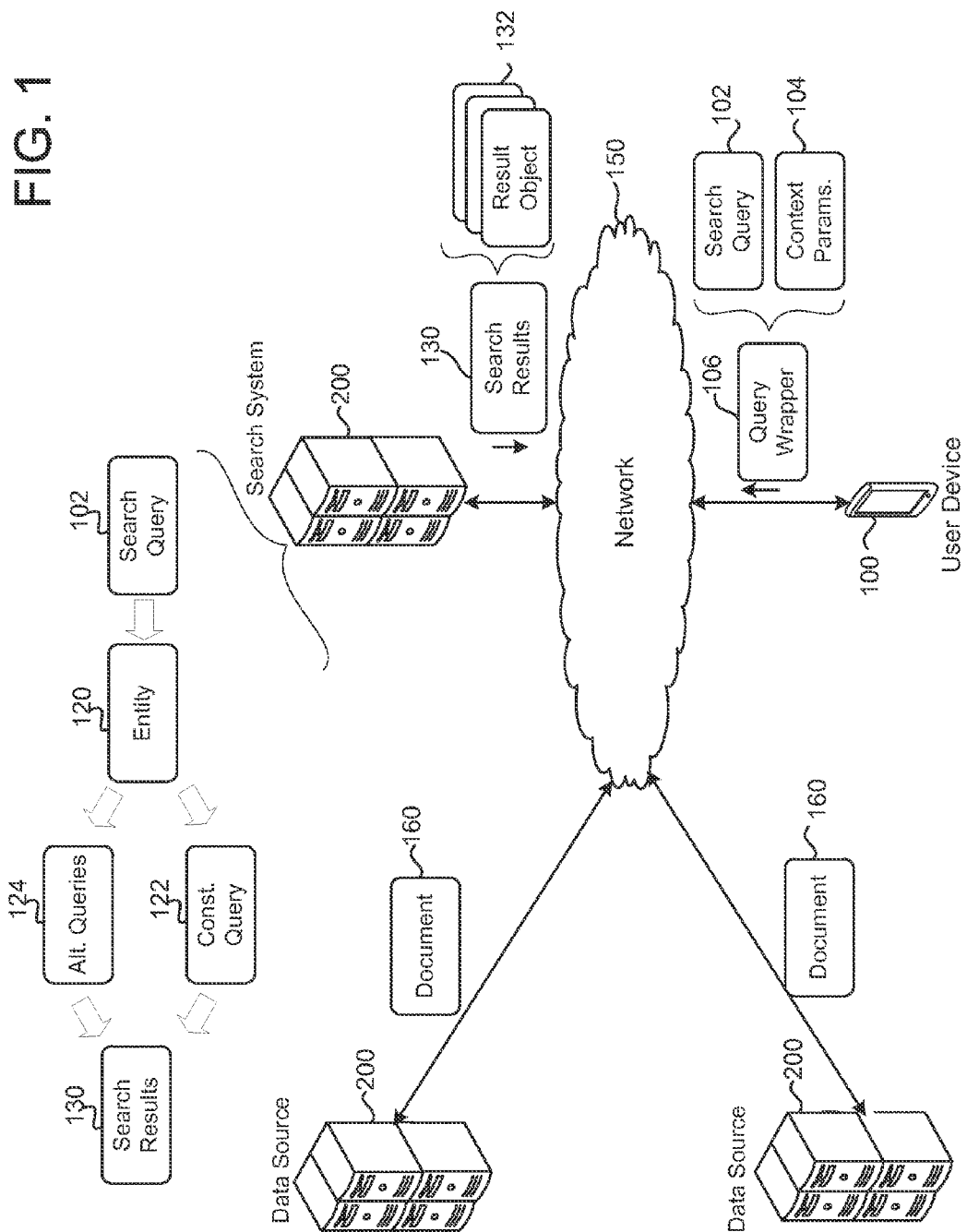

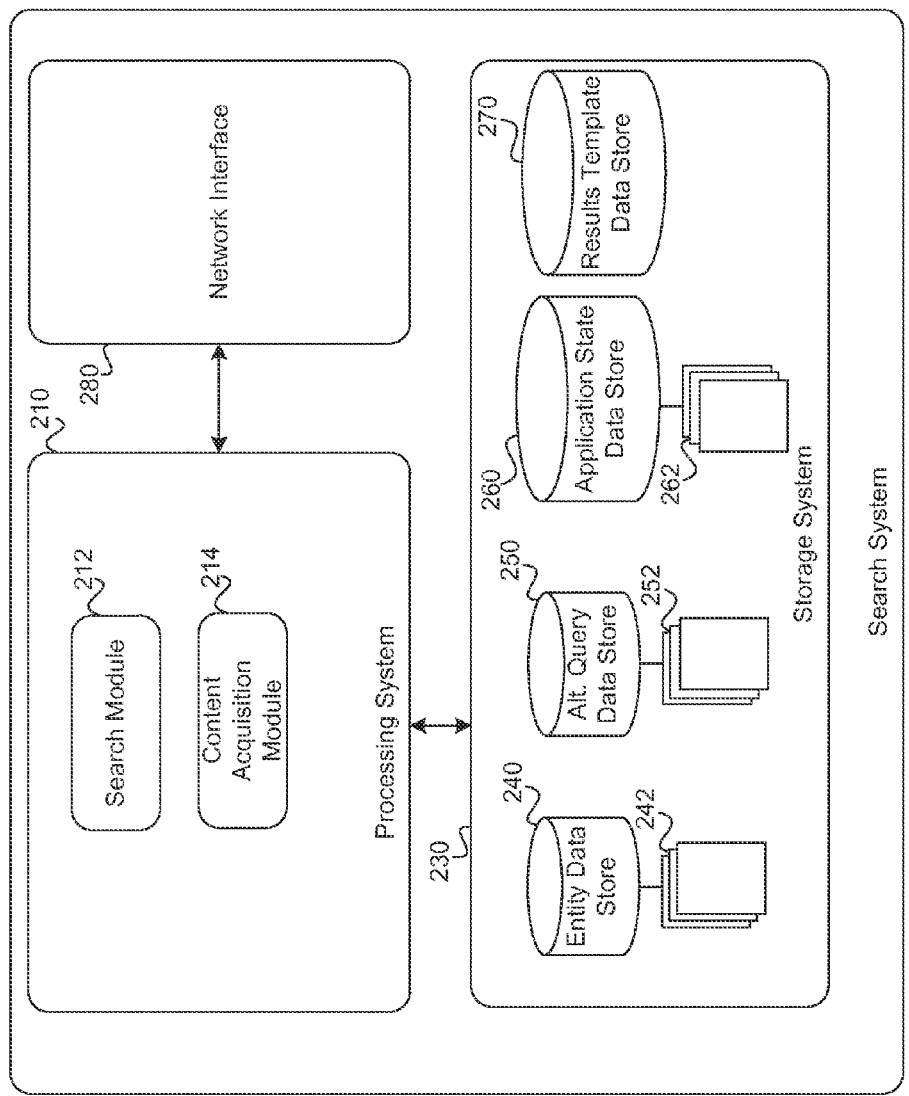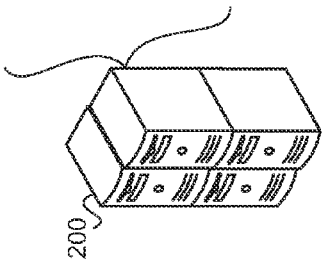
FIG. 2A

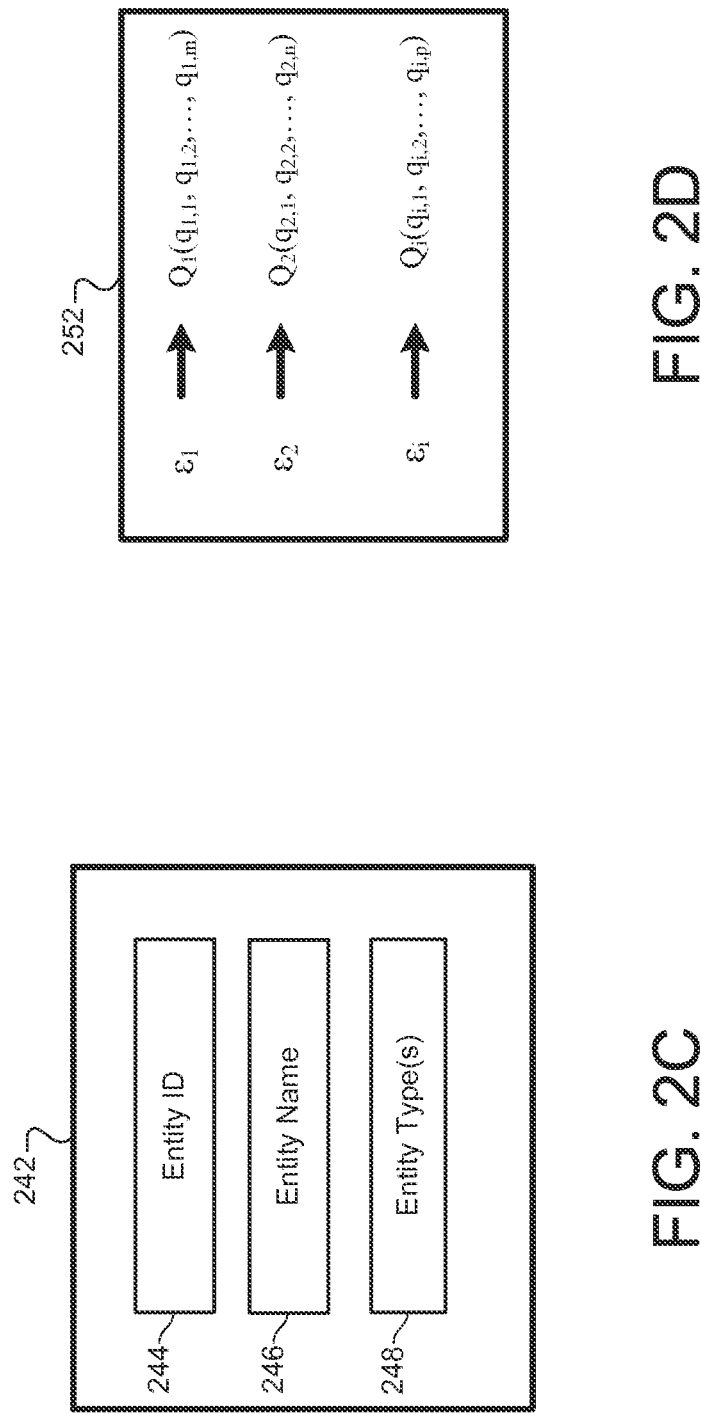

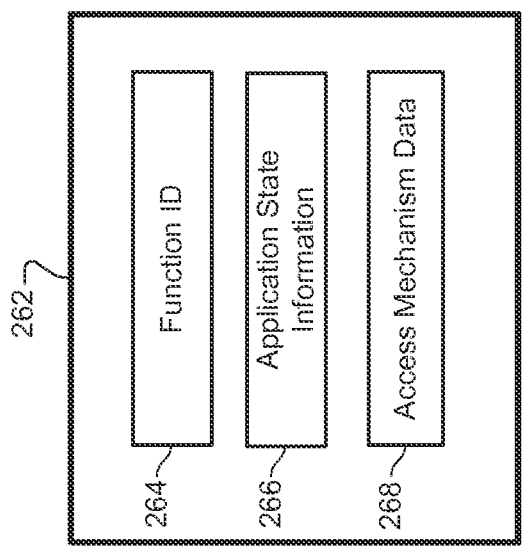

GENERATING SEARCH RESULTS USING A SET OF ALTERNATE SEARCH QUERIES

TECHNICAL FIELD

This disclosure relates to the generating search results using a set of alternate search queries. In particular, the set of alternate search queries

BACKGROUND

Search engines are the one of the most utilized technologies in today's fast-paced world. Users utilize search engines for many different types of searches. Some searches are very broad and require disambiguation. Other searches are very specific. Some of these searches are entity based, in that they name a specific entity. For example, a user searching for a coffee shop may search for "Starbucks" because of their preference for STARBUCKS® coffee. These types of search queries, however, may fail to render adequate results for the user when there are not many STARBUCKS® coffee shops in the vicinity of the user.

SUMMARY

One aspect of the disclosure provides a method that included receiving, at a processing system having one or more processors, a search query containing one or more query terms from a remote device. The method includes identifying, by the processing system, an entity in the search query. The entity is a known entity name of a known entity type. The method includes determining, by the processing system, a set of alternate search queries based on the identified entity. The alternate search queries are configured to identify states of software applications that correspond to entities that are substitutes for the identified entity. The method includes identifying, by the processing system, a consideration set of application state records stored in an application state data store based on the alternate set of search queries. Each application state record defines a state of a respective software application that is at least relevant to one or more of the alternate search queries. The method also includes generating, by the processing system, search results based on the consideration set and transmitting, by the processing system, the search results to the remote device.

Implementations of the disclosure may include one or more of the following optional features. In some implementations, determining the set of alternate search queries includes: querying a query lookup table with an entity ID of the entity or a combination of an entity name of the entity and an entity type indicating a classification of the identified entity; and receiving the set of alternate search queries from the query lookup table. Determining the set of alternate search queries may further include: determining one or more query constraints based on the entity type and one or more context parameters received with the search query; and adding the constraints to each of the set of alternate search queries. At least a subset of the set of alternate search queries are application-specific search queries, where an application-specific search query is constrained to application state records corresponding to a single software application.

In some examples, the method also includes determining, by the processing system, a constraint rule from a plurality of constraint rules based on an entity type of the identified entity. The method includes: determining, by the processing system, a location constraint for the search query based on the constraint rule and a location of a user device that transmitted the search query; and generating, by the processing system, a constrained search query based on the location constraint and the search query, wherein the consideration set if further identified based on the constrained search query. In some examples, identifying the consideration set includes: querying a search index based on the constrained search query. The search index identifies zero or more application state records that are relevant to the constrained search query. The method also includes determining whether a number of application state records identified by the search index exceeds a threshold, and when the number of application state records does not exceed the threshold, querying the search index based on the set of alternate search queries.

In some implementations, the set of alternate search queries are learned off line and are stored in relation to an entity identifier of the entity in an alternate query data store. The set of alternate search queries is generated by: crawling, by the processing system, a content rich software application, thereby obtaining a set of first documents; clustering, by the processing system, the first set of documents into a plurality of groups based on features defined in the documents; and identifying, by the processing system, a group of documents from the plurality of groups that contains a document corresponding to the entity. The set of alternate search queries is also generated by: identifying, by the processing system, other entities referenced by other documents in the group of documents to obtain a set of related entities; crawling, by the processing system, one or more other software applications to obtain a second set of documents; and separating, by the processing system, the second set of documents into first and second subsets. The first subset contains documents relating to the entity or the related entities and the second subset contains documents not related to the entity or the related entities. The set of alternate search queries is also generated by: extracting, by the processing system, one or more features that differentiate the documents in the first subset and the documents in the second subset; and generating, by the processing system, the set of alternate search queries based on the one or more extracted features. In some examples, the remote device is a user device on which the search query was provided.

Another aspect of the disclosure provides a search system. The search system includes a network interface, a storage system, and a processing system. The storage system includes one or more storage devices. The storage system stores an application state data store and an alternate query data store. The application state data store stores a plurality of application state records. Each application state record defines a state of a respective software application. The alternate query data store stores a query lookup table. The query lookup table respectively relates entities to a corresponding set of alternate search queries. Each set of alternate search queries correspond to a respective entity and are configured to identify states of software applications that correspond to entities that are substitutes for the corresponding entity. The processing system includes one or more processors that execute computer-readable instructions. The computer-readable instructions cause the processing system to: receive a search query containing one or more query terms from a remote device via the network interface; identify an entity in the search query, the entity being a known entity name of a known entity type; determine a set of alternate search queries based on the identified entity; and identify a consideration set of application state records based on the alternate set of search queries. The computer-readable instructions also cause the processing system to: generate search results based on the consideration set; and transmit the search results to the remote device.

In some examples, determining the set of alternate search queries includes: querying the query lookup table with an entity ID of the entity or a combination of an entity name of the entity, and an entity type indicating a classification of the identified entity; and receiving the set of alternate search queries from the query lookup table. In some examples, determining the set of alternate search queries further includes: determining one or more query constraints based on the entity type and one or more context parameters received with the search query; and adding the constraints to each of the set of alternate search queries.

In some implementations, at least a subset of the set of alternate search queries are application-specific search queries. An application-specific search query is constrained to application state records corresponding to a single software application.

The computer-readable instructions further cause the processing system to: determine a constraint rule from a plurality of constraint rules based on an entity type of the identified entity; and determine a location constraint for the search query based on the constraint rule and a location of a user device that transmitted the search query. The computer-readable instructions further cause the processing system to generate a constrained search query based on the location constraint and the search query. The consideration set is further identified based on the constrained search query. Identifying the consideration set includes querying a search index based on the constrained search query. The search index identifies zero or more application state records that are relevant to the constrained search query. In addition, identifying the consideration set includes determining whether a number of application state records identified by the search index exceeds a threshold, and when the number of application state records does not exceed the threshold, querying the search index based on the set of alternate search queries.

In some implementations, the set of alternate search queries are learned off line. The set of alternate search queries is generated by crawling a content rich software application, thereby obtaining a set of first documents, and clustering the first set of documents into a plurality of groups based on features defined in the documents. In addition, the set of alternate search queries is generated by: identifying a group of documents from the plurality of groups that contains a document corresponding to the entity; identifying other entities referenced by other documents in the group of documents to obtain a set of related entities; and crawling one or more other software applications to obtain a second set of documents. The set of alternate search queries is also generated by: separating the second set of documents into a first and second subset, extracting one or more features that differentiate the documents in the first subset and the documents in the second subset; and generating the set of alternate search queries based on the one or more extracted features. The first subset contains documents that relate to the entity or the related entities; and the second subset contains documents not related to the entity or the related entities.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 1 is a schematic illustrating an example environment of a search system.

FIG. 2A is a schematic illustrating example components of a search system.

FIG. 2C is a schematic illustrating an example of an entity record.

FIG. 2D is a schematic illustrating an example of a query lookup table.

FIG. 2E is a schematic illustrating an example of an application state record.

Like reference symbols in the various drawings indicate like elements.

DETAILED DESCRIPTION

Figure 2B:
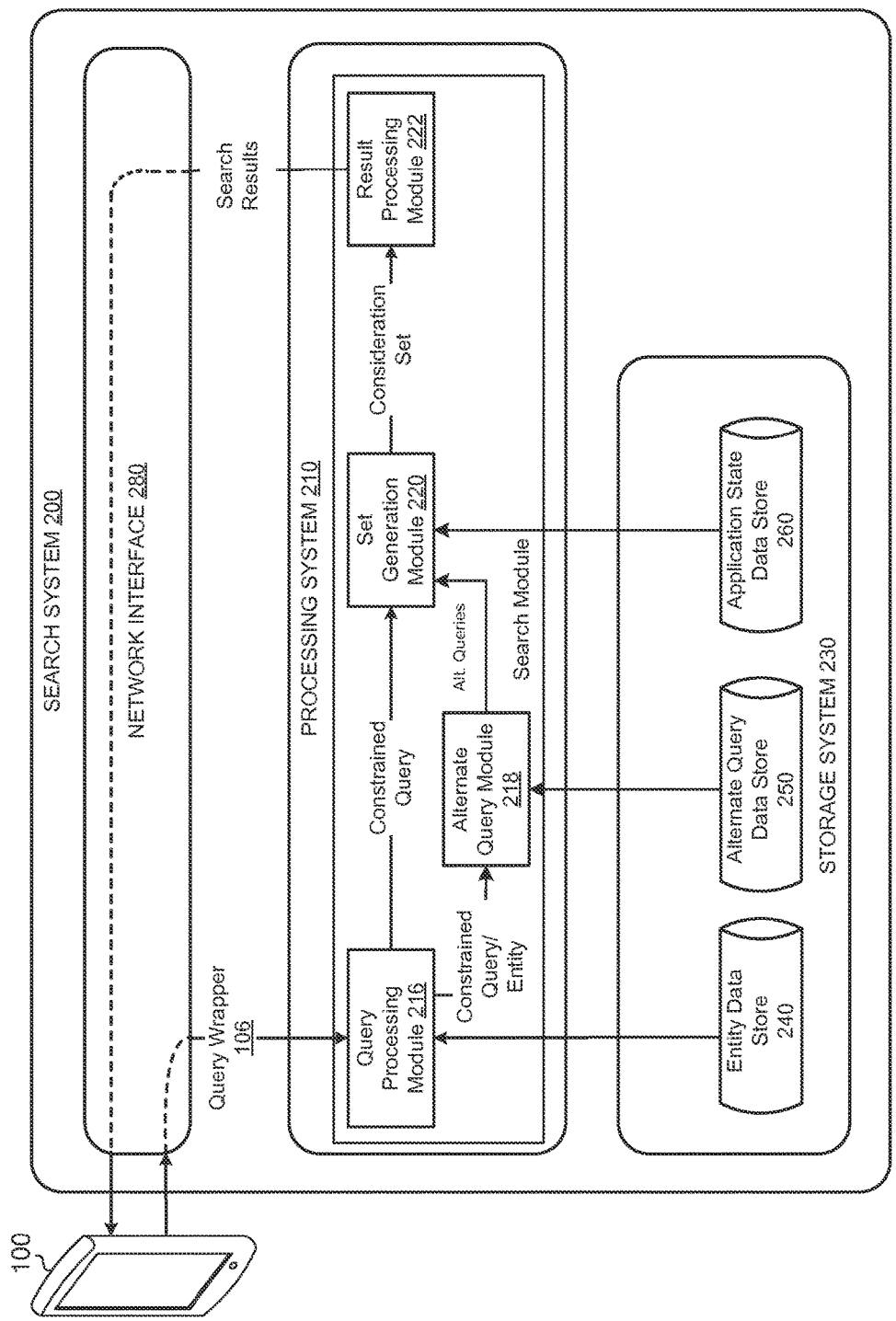
FIG. 2B is a schematic illustrating example components of the search module and a data flow thereof.

Many users provide entity-specific search queries. An entity-specific search query is a search query that is directed to a specific entity. Examples of entity-specific search queries are "mcdonalds near me," "starbucks open late," and "walmart open now." The first example search query is searching for MCDONALDS® restaurants near the user. The second example search query is searching for a STARBUCKS® coffee shop that is open late. The third example search query is searching for a WALMART® superstore that is open now. Each of these search queries may have constraints that are placed on the search query, either implicitly or explicitly. An explicit constraint is a constraint on the search query that is entered by the user. In the examples above, the constraints can include "near me," "open late," and "open now." An implicit constraint is a constraint that a search engine may include in the search query based on typical user preferences. For example, a user searching for a coffee shop in Detroit, Mich. is not interested in seeing results in Toledo Ohio. Similarly, a user searching for a restaurant may not wish to see results directed to restaurants that are currently closed. Thus, a search system may place one or more constraints on the search queries in order to improve the quality (e.g., relevance) of the search results.

According to implementations of the present disclosure, a search system may be configured to generate a set of alternate search queries. For instance, when the search system detects an entity specific search query, the search system may determine a set of alternate search queries based on the detected entity. The alternate search queries are search queries that are configured to surface search results that are adequate substitutes for the searched for entity. Furthermore, the search system may include one or more constraints on the alternate search queries. The search system utilizes the alternate search queries to generate the search results. In this way, the search system can provide improved search results.

According to implementations of the present disclosure, the search system determines sets of alternate search queries for a recognized entity. In some implementations, the search system can learn about an entity. Using an entity relationship, the search system can identify similar entities. For instance, the system may identify MCDONALDS® as a restaurant entity. Using one or more feature identification/extraction techniques, the search system may identify BURGER KING®, ARBY'S® and WENDY'S®, but not DENNY'S® as related entities. The search system then may then analyze the content of one or more applications to identify search queries that would implicate the related entities, but not the unrelated entities. These search queries may be application-specific search queries. An application-specific search query is a search query that triggers states of the application corresponding to the related entities (and other similar entities), but not unrelated entities. The determined alternate application-specific search queries may be stored in a query lookup table record. The set of alternate application-specific search queries may be used to perform subsequent searches and/or to backfill inadequate search results.

FIG. 1 illustrates an example environment 10 of a search system 200. A search system 200 is a collection of computing devices that receives search queries 102 from user devices 100 via a network 150. While the user device 100 is depicted as a smartphone, a user device can be any suitable user computing device including, but not limited to, a tablet computing device, a personal computing device, a laptop computing device, a gaming device, a vehicle infotainment device, and/or a smart appliance (e.g., smart refrigerator or smart television). In response to receiving a search query 102 from a user device 100, the search system 200 generates search results 130 based on the search query 102 and provides the search results 130 to the user device 100. In the illustrated example, the search results 130 can include one or more result objects 132. Each result object 132 may contain instructions and data that, when rendered by a user device 100, provides a user selectable link to a state of a software application. A user selectable link is a user interface element that, when selected by a user, causes the user device 100 to access a state of a software application indicated by the user selectable link. Selection of a user selectable link can cause the user device 100 to access the state of the software application using a native application edition of the software application or a web application edition of the software application.

Each result object may correspond to an individual search result. The user device may render the individual search results in a search engine results page (SERP) or an equivalent graphical user interface. Each result object may include one or more access mechanisms that correspond to a state of a software application. The access mechanisms may be application access mechanism (e.g., application resource identifiers) that links to a native application edition, web access mechanisms (e.g., URLs) that links to a web application edition, and/or a script that may link to a native application edition and/or a web application edition. In the event that a state of a software application may be accessed by more than one editions of the software application (e.g., a web application edition and one or more native application editions), the result object may contain more than one access mechanism. In such a scenario, the different access mechanisms may be used to access the state using the different application editions.

A search result may include other displayed information, such as an icon of an application, a text snippet from the linked state, a description of the application state, and/or an image. A result object 132 may further contain display data that indicates the information to be displayed in the data that is displayed in the search results 130.

The search system 200 may analyze a search query 102 to identify one or more entities 120 that are present in the search query 102. An entity 120 may have one or more entity types. An entity type may refer to a classification of an entity 120. Examples of entities 120 and entity types may be: the entity "basketball" has an entity type of "sport," the entity "GOLDEN STATE WARRIORS" has an entity type "NBA team" and/or "Professional sports team," and the entity "MCDONALDS" has the entity type "restaurant" and/or "fast food restaurant." The foregoing are non-limiting examples of entities and entity types.

The search system 200 may utilize an identified entity 120 and its respective entity type to generate a constrained search query 122 and/or a set of one or more alternate search queries 124. It is noted that an entity name and its entity type(s) can be indicated by an entity identifier ("entity ID"), discussed in greater detail below. A constrained search query 122 is a search query that includes one or more constraints. For example, a search for a particular fast food restaurant may be constrained by a distance limit (e.g., "within 10 miles") or by an operating hour constraint (e.g., "open now" or "open until 2:00 AM"). The constraints may be explicitly included in the search query 102 by a user and/or may be added to the search query 102 by the search system 200. For instance, if the user searches for a STARBUCKS coffee shop, the user may enter the search query "starbucks near me." In response to the search query 102, the search system 200 may constrain the search query 102 to locations within a certain radius (e.g., within 20 miles).

According to implementations of the present disclosure, the search system 200 is configured to determine a set of alternate queries 124 based on the search query 102. In some implementations, the alternate queries 1124 are application specific queries. An application specific query may be a query intended to identify states of a specific software application. The alternate queries 124 may be intended to identify additional states of applications that the received search query 102 may not have implicated. For example, in response to the search query 102 "McDonalds near me," the search system 200 may generate the following app-specific alternate search queries 124:

"App_title=Maps_App & cat.=fast food & desc='burger' & desc !='taco' & loc=xxx, yyy & radius=20 m"

"App_title=Place_Finder cat.=restaurant & desc='burger' & 'fast food' & loc=xxx, yyy & radius=20 m"

. . .

In the above example, the search system has generated a first app-specific alternate search query 124 directed to an example software application called "Maps App." In this example, the first app-specific alternate search query 124 is a Boolean search query that includes a requirement that the category corresponding to a state is "fast food," that the description contains the term "burger" but not "tacos," and that the location of the restaurant is within 20 miles of an example location xxx, yyy. In this way, the search system 200 may identify records corresponding to restaurants described in the "Maps App" software application that are likely to be similar to a MCDONALD'S restaurant. Similarly, the second example app-specific alternate search query 124 is a Boolean search query that includes a requirement that the category corresponding to the state is "restaurant" and that the description contains the terms "burger" and "fast food." Again, the search system 200 may identify records of an example software application called "Place Finder" that are likely to be similar to a MCDONALD'S restaurant. In the above example, the categorizations of the Place Finder application and the Maps App application differ, in that the Maps App application includes a "fast food" categorization, while the Place Finder application has a "restaurant" category. Accordingly, the app-specific alternate search queries 124 may be generated in order to consider the internal schemas of different software applications when searching for content published by those software applications.

In operation, the search system 200 receives a search query 102. The search query 102 may be included in a query wrapper 106 to further include one or more context parameters 104. The search system 200 may parse and analyze the search system 200. During the analysis, the search system 200 may identify an entity 120 in the search query 102 and an entity type of the entity 120. The search system 200 may generate a constrained search query 122 based on the search query 102, the context parameters 104, and/or the recognized entity. The constrained search query 122 may include a location constraint, a time constraint, or any other suitable constraint. The search system 200 may also generate one or more alternate search queries 124 based on the entity and/or entity type. In some implementations, the search system 200 retrieves a set of stored alternate queries 124 that correspond to the recognized entity 120. The alternate queries 124 may be app-specific or may not be app-specific. The search system 200 may add constraints to the retrieved alternate queries 124. For instance, the search system 200 may add a location constraint, a time constraint, or any other suitable constraint. The search system 200 searches an application state data store based on the constrained search query 122 and the alternate search queries 124. The search system 200 generates a set of search results 130 based on the search of the application state data store. The search results 130 indicate states of software applications that are relevant to the search query 102. The search system 200 may transmit the search results 130 to the user device 100.

The search system 200 may also be configured to identify sets of alternate queries for recognized entities. In some implementations, the search system 200 can crawl content-rich software applications to identify groups of similar entities. The search system 200 may take the most popular entities (e.g., the ten thousand most searched for entities). For each of these entities, the search system 200 may identify a set of similar entities based on the content of a content rich software application. For instance, for finding similar entities to the restaurant MCDONALD'S, the search system 200 may crawl the very popular YELP® application or a similar application. The search system 200 may obtain a set of documents 160 from the software application, whereby the documents 160 (e.g., HTML documents) represent different entities. The search system 200 may cluster the documents 160 to identify the documents 160 that are the most similar to the chosen entity (e.g., MCDONALD'S). For example, similar documents may recite similar categories, similar descriptions, similar prices, and/or similar reviews. The documents 160 in the MCDONALD'S cluster may contain a set of entities that are very similar to MCDONALD'S (e.g., WENDY'S, BURGER KING, but not TACO BELL). Once the search system 200 has identified the similar entities, the search system 200 can obtain documents 160 from other software applications that provide content related to the entity (e.g., other restaurant related software applications). The search system 200 can analyze these documents to identify features that are present in the documents 160 of the similar entities, but not in the documents 160 pertaining to the dissimilar entities. For example, the search system 200, in identifying the set of alternate search queries 124 for the entity MCDONALD'S, may obtain documents 160 pertaining to the entities WENDY'S, BURGER KING, and TACO BELL from various software applications. The search system 200 may then analyze the documents 160 identify the features that are present in the documents 160 pertaining to the WENDY'S and BURGER KING documents, but not in the documents 160 pertaining to the entity TACO BELL. In this example, the former documents 160 may be categorized by a specific application (e.g., "Maps App") as "fast food" and may contain the term "burger" but not "taco." The search system 200 can then generate a set of alternate search queries 124 based on this analysis. In some implementations, the search system 200 analyzes sets of documents 160 that are obtained from the same software application together. In these implementations, the results of the analysis may be used to generate app-specific alternate search queries. The search system 200 may generate the sets of alternate search queries 124 in other suitable manners.

FIG. 2A illustrates an example set of components of a search system 200. In the illustrated example, the search system 200 includes a processing system 210, a storage system 230, and a network interface 280. The components depicted in FIG. 2A are provided for example, and the search system 200 may include any other suitable components. The components may be interconnected, for example, by a bus and/or any other form or medium of digital data communication, e.g., a communication network 150.

The processing system 210 is a collection of one or more processors that execute computer readable instructions. In implementations having two or more processors, the two or more processors can operate in an individual or distributed manner. In these implementations, the processors may be connected via a bus and/or a network. The processors may be located in the same physical device or may be located in different physical devices. The processing system executes a search module 212 and a content acquisition module 214.

The network interface device 280 includes one or more devices that perform wired or wireless (e.g., Wi-Fi or cellular) communication. Examples of the network interface devices include, but are not limited to, a transceiver configured to perform communications using the IEEE 802.11 wireless standard, an Ethernet port, a wireless transmitter, and a universal serial bus (USB) port.

The storage system 230 includes one or more storage devices. The storage devices may be any suitable type of computer readable mediums, including but not limited to read-only memory, solid state memory devices, hard disk memory devices, and optical disk drives. The storage devices may be connected via a bus and/or a network. Storage devices may be located at the same physical location (e.g., in the same device and/or the same data center) or may be distributed across multiple physical locations (e.g., across multiple data centers). The storage system 230 stores an entity data store 240, an alternate query data store 250, a record data store 260, and a results template data store 270. Example contents of the respective data stores 240, 250, 260 are discussed in detail below.

FIG. 2B illustrates an example of a search system 200 processing a query wrapper 106. FIG. 2B illustrates a non-limiting example of a set of components of the search module 212 search module 212. In the illustrated example, the search module 212 includes a query processing module 216 (also known as a query understanding module 216), an alternate query generation module 218, a set generation module 220, and a results processing module 222, all of which may be implemented as computer-readable instructions that are executed by the processing system 210. The search module 212 may include other components that are not explicitly shown. For example, the search module 212 may include a rules-based search component.

The query processing module 216 receives a query wrapper 106 and can output a constrained query 122 and/or one or more recognized entities. According to some implementations, the query wrapper 106 contains a search query 102 and one or more context parameters 104. Upon receiving a query wrapper 106, the query processing module 216 may decode the query wrapper 106 to identify the search query 102 and the context parameters 104.

The query understanding module 216 identifies an entity 120 that may be present in the search query 102. For instance, a search query 102 may contain the text "starbucks near me." The query understanding module 216 analyzes the search query 102 to identify the entity STARBUCKS in the search query 102. Furthermore, based on an ontology implemented by the search system 200, the query understanding module 216 may identify the entity STARBUCKS as a coffee shop entity type. In some scenarios, some terms may correspond to multiple entities. For example, the term "lax" may correspond to an airport (i.e., Los Angeles international Airport) or a sport (i.e., lacrosse). In such a scenario, the query understanding module 216 may identify multiple entities and may assign a confidence score to each entity. For instance, in the example of "lax," the term is much more likely to be used as meaning the airport than meaning lacrosse. Thus, the query understanding module 216 may assign a higher confidence score to the entity LAX having an entity type of "airport" than the entity LAX having an entity type of "sport." The query understanding module 216 may look to other terms in the search query 102 and/or the context parameters 104 to help disambiguate the potential interpretations of a term. For instance, if the search query 102 is "lax apparel," the query understanding module 216 may assign a higher confidence score to the interpretation where the entity type is "sport." If however, the search query 102 is "lax directions" and the query parameters 104 indicate that the location of the user device 100 is near Los Angeles, Calif., the query understanding module 216 may assign a higher confidence score to the interpretation where the entity type is "airport."

In some implementations, the query understanding module 216 leverages the entity data store 240 to identify entities in the search query 102 and the entity types thereof. The entity data store 240 may store data relating to entities. The entity data store 240 may include databases, graphs, indexes, look-up tables, and/or records.

In some implementations, the entity data store 240 stores entity records 242. An entity record 242 may be any suitable data structure that indicates a particular entity 120. FIG. 2C illustrates an example of an entity record 242. An entity record 242 may include an entity ID 244, an entity name 246, and an entity type field 248. The entity ID 244 may be an alphanumeric string that uniquely identifies the entity. The entity name 246 may be a string that identifies the name of the entity itself (e.g., STARBUCKS, MCDONALD'S, TOY STORY). The entity type field 248 identifies one or more entity types of the entity 246. The entity types can be text strings indicating the entity type in natural language (e.g., "Restaurant") or alphanumeric strings that identify the entity type (e.g., entity type=1234). The entity type field 248 may contain multiple entity types if a particular entity is classified under more than one entity. For example, the entity MCDONALD'S may be a restaurant and may be further classified by the sub-entity type "fast food restaurant"). The entity record 242 may include other data as well. For instance, the entity record 242 may identify a list of software applications that are relevant to the entity type (e.g., movie streaming software applications are relevant to actor entities, movie title entities, and director entities). The entity record 242 may additionally identify other types of entities or entity types that are related to the entity. For example, a restaurant entity may be related to a city entity and/or a state entity.

The entity data store 240 may include an inverted index and/or a lookup table. The inverted index may be keyed using known entity names and may index to the entity records 242 that correspond to the entity names 246. The inverted index can receive a text string as input and can output the entity IDs 244 of the entity records 242, if any that correspond to the text string. For example, if the text string is "lax" the inverted index would output the entity records 242 of the airport entity LAX and the sport entity LAX. The search module 212 may utilize the Apache Lucene software library by the Apache Software Foundation or similar software libraries to implement the inverted index and to identify records 242 from the inverted index.

In some implementations, the entity data store 240 includes a lookup table that indicates a set of entity records 244 that correspond to a known entity name. The lookup table may operate in a manner similar to the inverted index. Namely, the lookup table may receive a text string and may output the entity IDs of the entities that share the same entity name. The lookup table may also output additional information, such as a confidence score for each outputted entity ID 244. For example, in response to the text string "lax" the lookup table may output the following (entity_id, confidence score) pairs: (1234, 0.89), (2421, 0.05), where 11234 is the entity ID for the airport entity LAX and 2521 is the entity ID for the sport entity LAX.

The query understanding module 216 parses the search query 102 and identifies n-grams of terms in the query (e.g., single terms, bi-grams and tri-grams). For each identified n-gram, the query understanding module 216 can search the 222 using the n-gram to identify any entities that are potentially contained in the search query 102. For instance, the query understanding module 216 may query the inverted index or lookup table using the n-gram to identify the entity records 242 that correspond thereto (e.g., contain a matching entity.

In some scenarios, an n-gram may correspond to more than one entity. In such a scenario, the query understanding module 216 may be configured to select the recognized entity having the highest confidence score as the recognized entity in the search query 102. In some implementations, the query understanding module 216 can determine the confidence score from the lookup table (e.g., confidence score is pre-calculated offline). Additionally or alternatively, the query understanding module 216 may utilize the context parameters 104 and/or other terms in the search query 102 to determine the confidence score. In these implementations, the query understanding module 216 may utilize a set of rules that determine the confidence scores of recognized entities using the context parameters 104 and/or terms in the search query 102. Examples of such rules may be found, for example, in U.S. patent application Ser. No. 14/339,588, filed on Jul. 24, 2014, the relevant contents of which are herein incorporated by reference.

The query understanding module 216 may utilize the recognized entity 120 to generate a constrained query 122. The query understanding module 216 may utilize the entity type of the recognized entity, the query terms in the search query 102, and/or the context parameters 104 to generate the constrained search query 122. The query understanding module 216 can utilize the entity type to determine a constraint rule to generate the query term. For example, if the entity type corresponds to brick-and-mortar establishments (e.g., restaurants, retail shops, gas stations) the query understanding module 216 may utilize a constraint rule that pertains to brick-and-mortar establishments. For example, the rule may take into the type of establishment and the population density of the current location of the user device 100 when determining the constraint. For instance, a rule corresponding to brick-and-mortar entities may define:

if the establishment is a restaurant and the population density corresponds to an urban area then the search radius is less than two miles;

if the establishment is a restaurant and the population density corresponds to a suburban area then the search radius is less than five miles;

if the establishment is a restaurant and the population density corresponds to a rural area then the search radius is less than ten miles;

if the establishment is a retail shop and the population density corresponds to a urban area then the search radius is less than five miles;

if the establishment is a restaurant and the time is after 9:00 PM or before 8:00 AM, then the time constraint is "open now";

if the establishment is a retail shop and the time is after 7:00 PM or before 10:00 AM, then the time constraint is "open now";

if the establishment is a business office and the time is after 5:00 PM or before 9:00 AM, then the time constraint is "open now";

The foregoing provides examples of a rule used to determine potential constraints. The query understanding module 216 may utilize other constraints. For example, another rule set may be used to parse media related entity types (e.g., song tiles, artist names, movie titles, television show titles, actor names), such that the query understanding module 216 may identify constraints, such as "available for streaming" or "in a theatre near me."

The query understanding module 216 may utilize a knowledge base to determine information in making a determination. For example, a knowledge base may identify whether locations are urban, suburban, or rural. Similarly, a knowledge base may identify a time zone of a location. Thus, the query understanding module 216 may leverage the knowledge base to determine which constraints apply to a given search query.

The query understanding module 216 may add the constraints to the search query 102 to obtain a constrained search query 122. It is noted that in some implementations, the query understanding module 216 does not generate constrained search queries 122, but rather only processes the query to determine the possible entity or entities in a search query 102 and the entity types thereof. The query understanding module 216 may output the constrained search query 122, entity ID of the identified entity, and/or confidence score of the entity ID to the alternate query generation module 218 and the set generation module 220. In some implementations, the query understanding module 216 outputs the entity name and entity type(s) thereof instead of the entity ID. Thus, the term entity may include an entity ID or a combination of an entity name and an entity type of the entity.

The alternate query generation module 218 receives an entity (e.g., an entity ID) and outputs a set of alternate search queries 124. In some implementations, the alternate search queries 124 are app-specific alternate search queries. In some implementations, the alternate query generation module 218 also receives the constrained search query 122. The alternate query generation module 218 may utilize the constraints in the constrained search query 122 to constrain the alternate search queries 124.

The alternate query generation module 218 may leverage the alternate query data store 250 to identify alternate search queries. Alternate search queries are search queries that are intended to surface search results 130 (e.g., application state records 262) that are sufficient replacements for search results 130 containing the recognized entity. For example, if a user is searching for the fast food restaurant MCDONALD'S, an alternate search query is intended to identify search results that are not necessarily directed to MCDONALD'S, but also results that contain entities that are similar to the searched for entity (e.g., BURGER KING and WENDY'S). The alternate query data store 250 may include databases, graphs, indexes, look-up tables, records, and/or files. In some implementations, the query data store 250 stores one or more query lookup tables 252.

FIG. 2D illustrates an example query lookup table 252. A query lookup table 252 relates specific entities, $\varepsilon$, to a set of alternate search queries, Q. Put another way, an entity, $\varepsilon_i$, maps to a set of alternate search queries $Q_i(q_{i,1}, q_{i,2}, \ldots, q_{i,n})$, where $q_{i,1}, q_{i,2}, \ldots, q_{i,n}$ are n alternate queries that can be used to identify search results that are sufficient replacements for search results directed to the entity, $\varepsilon_i$. The entities in the lookup table 252 may be identified by their unique entity ID 244 or by an entity name 246 and entity type 248. The query lookup table 252 can be queried using an entity (e.g., an entity ID 244 or an entity name 246 and an entity type 248) and the query lookup table 252 returns a corresponding set of alternate search queries Q. In some implementations, the alternate search queries are learned off-line by the content acquisition module 214. The learning may be supervised or unsupervised and is discussed in further detail below. The teaming process includes relating a set of alternate search queries to a specific entity, whereby the relationship is defined in the query lookup table 252. Each set of alternate queries can contain app-specific search queries and/or generic search queries (i.e., search queries that do not limit the search to a specific software application).

As previously discussed, an app-specific search query is a search query that is intended to surface application state records 262 that define states of a particular software application indicated in the app-specific search query. In this way, the surfaced application state records 262 are more likely to be relevant, which reduces the computational resources necessary to score the application records. The app-specific search queries are Boolean search queries and/or natural language search queries. An example app-specific search query directed to the example software application "Maps App" may be: q=(App_Title=="Maps App" & cat.="restaurants" & desc="burger"). The foregoing search query is intended to find any application state records 262 where the title of the software application is "Maps App," the category of the application state is "restaurants" and the description contains the string "burger."

A generic search query is an alternate search query that does not contain a reference to a specific application. A generic search query surfaces any application state records 262, regardless of the software application, provided the rest of the conditions in the generic search query are met. An example of a generic search query may be (desc="burger" & desc !="taco" & desc !="pizza"). In this example, any application state record 262 containing the term burger white excluding the terms "taco" and "pizza" would be implicated by the example search query, regardless of the software application to which the application state record 262 corresponds.

While FIG. 2D illustrates a lookup table, a set of alternate queries can be identified given an entity (e.g., an entity ID) in other suitable manners. For instance, the alternate query data store 250 may be implemented using an inverted index and a set of alternate query records. Such configurations of the alternate query data store 250 are within the scope of the disclosure.

Referring back to FIG. 2B, upon receiving an entity (e.g., an entity ID 244 or an entity name and entity type), the alternate query generation module 218 identifies a set of alternate search queries, Q, based on the entity, ε. In some implementations, the alternate query generation module 218 searches a query lookup table 252 using the entity, ε (e.g., using the entity ID of the entity). The entity lookup table 252 returns a set of alternate search queries, Q that correspond to the entity, ε. In some implementations, the alternate query generation module 218 outputs the set of alternate search queries to the set generation module 220. In other implementations, the alternate query generation module 218 adds constraints to each of the alternate search queries 124 in the set of alternate search queries Q. In these implementations, the alternate query generation module 218 utilizes the constraints that were added to the constrained search query 122 by the query understanding module 216. The alternate query generation module 218 outputs the constrained alternate search queries 124 to the set generation module 220.

The set generation module 220 receives one or more search queries (constrained, unconstrained, app-specific, and/or general) and identifies a consideration set of application state records 262 based on the search queries. The set generation module 220 can search the application state data store 260 to identify application state records 262 that are at least somewhat relevant to a received search query 102. The application state data store 260 stores data corresponding to crawled states of software applications. The application data store 260 may include may include databases, graphs, indexes, look-up tables, and/or records. In some implementations, the application data store 260 stores application state records 262. An application state record 262 corresponds to a crawled state of a software application. The application state records 262 may be indexed by an inverted index.

FIG. 2E illustrates an example of an application state record 262. An example application state record 262 can include a function ID 264, application state information 266, and access mechanism data 268.

The function ID 264 may be an alphanumeric string that is used to identify the application state record 262 among the other application state records 262 included in the application state data store 260. Accordingly, a function ID 264 uniquely identifies a state of a software application from other states. In some implementations, the function ID 264 can also be used to access a state of an application. Put another way, the function ID 264 can be used to generate or lookup one or more access mechanisms that access the state of a software application indicated by the function ID. As previously discussed, a function ID 264 may be a string alphabetic, numeric, and/or symbolic characters (e.g., punctuation marks), a human-readable string that describes the state of the application, or a string having a structure of a resource identifier. In the latter implementations, a function ID 264 may utilize any suitable namespace (e.g., http:// or func:/). For example, a function ID 264 corresponding to a state of an example application "exampleapp" may be "func://exampleapp:search?cuisine_ID=4321 &loc=mountain_view" or "www.exampleapp.com/search?cuisine_ID=4321&loc=mountain_view."

In the illustrated example, the application state record 262 includes access mechanism data 268. The access mechanism data 268 can include one or more access mechanisms used to access the state of the software application represented by the application state record 262. Additionally, or alternatively, the access mechanism data 268 may include instructions that define a manner by which one or more access mechanisms may be derived from the function ID 264 defined in the application state record 262. In implementations where the access mechanism data 268 is used to generate access mechanisms, a lookup table can explicitly list the access mechanisms that correspond to the function ID 264. Similarly, instructions can define how to translate a function ID 264 into an application resource identifier, a web resource identifier, and/or a script. The access mechanism data 268 may further include an application download addresses that indicates locations where the native applications referenced in the application access mechanisms can be downloaded. In some implementations, access mechanism data 268 can include a script containing one or more instructions for accessing a state of an application (e.g., a script). In such implementations, the instructions can be used to access states of software applications via native application editions that are not accessible by application resource identifiers.

The application state information 266 may include data that describes an application state that a software application is set according to the access mechanism(s) described above. Additionally, or alternatively, the application state information 266 may include data that describes the function performed according to the access mechanism(s) included in the application state record 262. The application state information 266 may include a variety of different types of data. For example, the application state information 266 may include structured, semi-structured, and/or unstructured data. The search system 200 may collect, extract, and/or infer the application state information 266. For example, the search system 200 may crawl a software application to identify and request documents, the documents representing different states of the software application. The search system 200 may scrape a document to identify the application state information 266. Additionally, or alternatively, the application state information 266 may be manually generated data. The search system 200 may update the application state information 266 in any application state record 262 so that up-to-date search results 130 can be provided in response to a search query 102.

In some implementations, the application state information 266 includes data that is presented to the user by a software application when an instance of an edition of the software application is set in the application state defined by the access mechanism data 268. The application state information 266 may include the text presented by an application edition of the software application is set to the state represented by the application state record 262. In one example, the application state record 262 is associated with a shopping application. In this example, an application state information 266 may include data that describes products (e.g., names, product descriptions, and prices) that are shown when the shopping application is set to the application state defined by the access mechanism data 268. In another example, an application state record 262 is associated with a music player application. In this example, the application state information 266 may include data corresponds to a particular song that can be played by a music software application. The application data 266 may include a name of the song, an artist of the song, and an album in which the song was released.

The application state data 266 may include structured data. The structured data may define a name of the software application and/or a name of the state of the software application. For example, the application state data 266 corresponding to a particular article found on an example news application XYZ may include the title of the news application (e.g., "application_title=XYZ"), a category of the article (e.g., "category=sports") and/or a title of the article (e.g., "article_title=Tigers trade starting pitcher"). In another example, the application state record 262 may represent an information page of a restaurant related software application ("Food Finder") that indicates a name of a restaurant, a description of the restaurant, reviews of the restaurant, information about the restaurant including when the restaurant is open and where the restaurant is located. In this example, the application state data 266 may include the name of the application (e.g., "application_title=Food Finder"), a name of the restaurant (e.g., "restaurant=Al Amir"), a type of the restaurant (e.g., "cuisine=Arabic"), a location of the restaurant (e.g., "loc=42.013, −83,434") and the hours of operation (e.g., "hours=10:00 to 22:00"). The types of data included in the application state information 266 may depend on the type of information associated with the application state and the functionality defined by the access mechanism(s).

The application state information 266 may further define keywords relating to the document described by the record 260. For instance, the application state information 266 may include any text found in the document (e.g., the text appearing in a web page or at a state of a native application). The application state information 266 may further include entity information, such as entity types that correspond to the state of the application defined by the application state record 262.

The set generation module 220 identifies a consideration set of application state records 262 based on the search query 102, the constrained search query 122, and/or the alternate search queries 124. The consideration set of application state records 262 may be a collection of function IDs 264, whereby each function ID 264 represents a respective application state record 262. The consideration set of records 262 may refer to the records 262 identified from the record data store 260 based on the search query 102, the constrained search query 122, and/or the alternate search queries 124. The contents of the application state records 262 of the application state data store 260 may be indexed in inverted indexes. In some implementations, the set generation module 220 utilizes the Apache Lucene software library by the Apache Software Foundation or a similar library to index the records 262 and to identify records from the inverted indexes. The set generation module 220 may search the inverted indexes to identify records 262 containing one or more of the query terms of the search query 102 or the constrained search query 122. Furthermore, in implementations where the alternate search queries are Boolean search queries 124, the set generation module 220 may search the search indexes to identify applications state records 262 that satisfy the conditions of the alternate search queries 124. For example, in the case of the app-specific search query q=(App_Title=="Maps App" & cat.="restaurants" & desc="burger"), the set generation module 220 includes a function ID 264 of an application state record 262 in the consideration set when the title of the software application is "Maps App," the category of the state is "restaurants," and the description contained in the state includes the term "burger." As the set generation module 220 identifies application state records 262, the set generation module 220 can include the function ID 264 of each identified record 262 in the consideration set. Further, in some implementations, the set generation module 220 determines an initial score of the record with respect to the search query 102. The initial score may indicate how well the contents of the application state record 262 matched any of the queries. For example, the initial score may be a function of the term frequency-inverse document frequency (TF-IDF) values of the respective query terms. The initial score may be based on other suitable factors as well.

The set generation module 220 scores each of the function IDs 264 in the consideration set. A result score is a score associated with a function ID 264 indicating the relevance of the application state corresponding to the function ID 264 given the search query 102 and/or the context parameter 104. The result scores associated with a function ID 264 may indicate the relative rank of the application state record 262 with respect to other application state records 262. For example, a greater result score may indicate that an application state record 262 is more relevant to the received search query 102 than an application state record 262 having a lesser score. The relevance of an application state record 262 may refer to the relevance of the state of the application to which the application state record 262 represents.

The information conveyed by the search results 130 may depend on how the result scores are calculated by the set generation module 220. For example, when the result scores indicate the relevance of a state of a software application to the search query 102, the popularity of the state, or other properties of the state may influence the result score. In such a scenario, the function IDs 264 corresponding to more popular states may have higher scores than function IDs corresponding to less popular states. In these implementations, search results 130 corresponding to the higher scored function IDs 264 may be displayed in a larger card in a search engine results page (SERP) and/or may appear higher in the SERP when rendered by a user device 100.

The set generation module 220 may generate result scores of function IDs 264 in a variety of different manners. In some implementations, the set generation module 220 generates a result score of a function ID 264 is based on one or more scoring features. The scoring features may be associated with the function ID 264 and/or the search query 102. Examples of scoring features include, but are not limited to, record scoring features, query scoring features, and record-query scoring features.

A record scoring feature may be based on any data associated with an application state record 262 corresponding to an identified function ID 264. For example, record scoring features may be based on any data included in the application state information 266 of the application state record 262. Example record scoring features may be based on metrics associated with a person, place, or thing described in the application state record 262. Example metrics may include the popularity of a place described in the application state record 262 and/or ratings (e.g., user ratings) of the place described in the application state record 262. For example, if the application state record 262 describes a song, a metric may be based on the popularity of the song described in the application state record 262 and/or ratings (e.g., user ratings) of the song described in the application state record 262. The record scoring features may also be based on measurements associated with the application state record 262, such as how often the application state record 262 is retrieved during searches and how often links generated based on the application state record 262 are selected by a user. The record scoring features may include other pertinent features.

A query scoring feature may include any data associated with the search query 102. For example, query scoring features may include, but are not limited to, the number of words in the search query 102, the popularity of the search query 102, and the expected frequency of the words in the search query 102. The query scoring features may include other pertinent features.

A record-query scoring feature may include any features that are based on data associated with both the application state record 262 that stores an identified function ID 264 and the search query 102 that resulted in identification of the application state record 262 by the set generation module 220. For example, record-query scoring features may include, but are not limited to, parameters that indicate how well the terms of the search query 102 match the terms of the application state information 266 of the identified function ID 264 and/or the initial score of the application state record 262. Additionally, the record-query scoring features may include any features that are based on data associated with the constrained search query 122 and/or any of the alternate search queries 124. For example, the record-query scoring features may include a flag indicating whether the constraints identified in the constrained search query 122 and/or the alternate search queries 124 are satisfied by the application state record 262. Additionally, the record-query scoring features may indicate which of the search query 102, conditioned search query 122, and/or the alternate search queries 124 resulted in the application state record 262 being included in the consideration set. For example, application state records 262 that are implicated by the conditioned search query 122 are likely to be more relevant than application state records 262 that were only implicated by an alternate search query 124.

The set generation module 220 may generate a result score for each function ID 264 in the consideration set based on at least one of the record scoring features, the query scoring features, and the record-query scoring features corresponding to the application state record 262 indicated by the function ID 264. In some examples, the set generation module 220 includes one or more machine learned models (e.g., a supervised learning model) configured to receive one or more scoring features. The one or more machine learned models may generate result scores based on at least one of the record scoring features, the query scoring features, and the record-query scoring features. For example, the set generation module 220 may pair the search query 102 with each function ID 264 and calculate a vector of features for each (query, function ID) pair. The vector of features may include one or more record scoring features, one or more query scoring features, and one or more record-query scoring features. In some implementations, the set generation module 220 can normalize the scoring features in the feature vector.

The set generation module 220 may then input the feature vector of a function ID 264 into a machine-learned regression model to calculate a result score for the function ID 264. In some examples, the machine-learned regression model includes a set of decision trees (e.g., gradient boosted decision trees). Additionally or alternatively, the machine-learned regression model may include a logistic probability formula. In some implementations, the machine learned task can be framed as a semi-supervised learning task, where a minority of the training data is labeled with human curated scores and the rest are used without human labels. The machine-learned model outputs a result score of the function ID 264. The set generation module 220 can calculate result scores for each of the function IDs 264 that the set generation module 220 receives. The set generation module 220 associates the result scores with the respective function IDs 264 and outputs the scored function IDs to the result processing module 222.

The results processing module 222 receives scored function IDs 264 from the set generation module 220 and generates search results 130 based on the scored function IDs 264. The generated search results 130 may be encoded in a container, such as a hyper-text markup language (HTML) document that can be embedded in another HTML document (e.g., via an iFrame) or a JavaScript objection notation (JSON) object. The search results 130 may include a plurality of result objects 132. Each result object represents an individual search result. Each result object may include one or more access mechanisms, data to be displayed in the search result (e.g., text, icons, images), and information indicating the manner by which the search result is displayed (e.g., a layout of the search result).

In operation, the results processing module 222 receives the scored function IDs 264 (e.g., the consideration set) and may select the function IDs 264 on which to base the search results 130. In some implementations, the results processing module 222 ranks the function IDs 264 according to their respective results scores. The rankings of the function IDs 264, at least in part, dictates the order in which the corresponding search results 130 are displayed in a SERP. Further, the results processing module 222 may exclude any function IDs 264 not having a requisite result score from the search results 130. The results processing module 222 can then generate result objects for each of the ranked/selected function IDs 264.

In generating the result objects, the results processing module 222 can utilize a result object template to generate a result object 132. A result object template can define the layout of a displayed search result (e.g., the format of a card that appears in the SERP). The results processing module 222 populates fields in a result object template with data pertaining to the function ID 264. For each selected function ID, the results processing module 222 instantiates a new result object 132 from the result object template. The results processing module 222 may then populate the new result object 132 with data from the application state record 262. For instance, the results processing module 222 can add visual data (e.g., icons and screen shots), textual data (e.g., titles, descriptions, and ratings), and one or more access mechanisms to the new result object template to obtain a result object 132. The results processing module 222 can retrieve the access mechanisms to include in the result object 132 from the access mechanism data 268 defined in the application state record 262 indicated by the function ID 264. The results processing module 222 can retrieve the visual data and textual data from the application state information 266 defined in the application state record 262 indicated by the function ID 264. The results processing module 222 may add additional information to the result object as well.

The results processing module 222 can include visual data in the fields defined in the result object template, which receive visual data. For example, the result object template may receive a file containing an image of icon of an application or an image of a screen shot of the application in its respective visual data fields. Additionally, the results processing module 222 can add textual data, such as a title of the application, a description of the state of the application, and/or any other suitable information.

Upon generating the result objects, the results processing module 222 can transmit the search results 130 to the user device 100 that provided the search query 102. In some implementations, the results processing module 222 encodes the result objects into a container, such as an HTML document or a .json file, thereby obtaining the search results 130. The results processing module 222 can provide the search results to a downstream component or downstream device, which in turn transmits the search results 130 to the user device 100 that provided the search query 102. In other implementations, the results processing module 222 transmits the search results 130 to the user device 100 that provided the search query 102.

Figure 3:
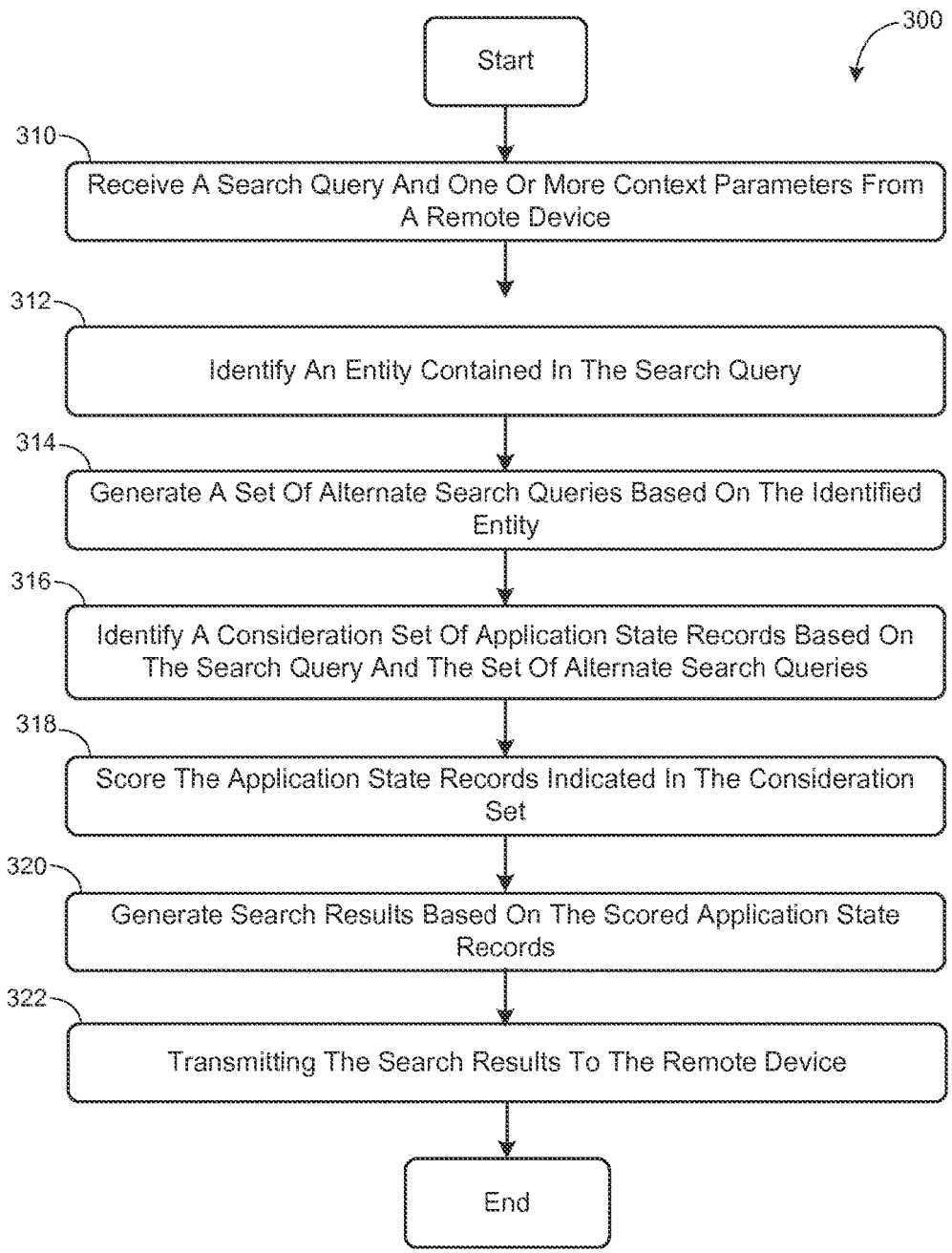
FIGS. 3-5 are flow charts illustrating example sets of operations for methods of processing a search query.

FIG. 3 illustrates an example set of operations of a method 300 for responding to a search query 102. The method is described with respect to the search system 200. The method 300 may be executed by other suitable devices as well.

At operation 310, the search system 300 receives a query wrapper 106 containing a search query 102 and one or more context parameters 104 from a user device 100. The search system 300 may receive the query wrapper 106 directly from the user device 100, or via an intermediate device (e.g., a partner to the search system 200). The search query 102 may contain one or more query terms. The context parameters 104 may indicate a context of the user device 100 (e.g., a location of the user device 100 and/or a list of applications installed on the user device) or a user of the user device 100 (e.g., a user profile).

At operation 312, the query understanding module 216 identifies an entity in the search query 102. The query understanding module 216 may parse the search query into various n-grams. The query understanding module 216 may search an entity data store 240 using the n-grams to determine whether any of the n-grams corresponds to a known entity. For example, the query understanding module 216 may query an inverted index using the n-grams, whereby the inverted index outputs entity IDs 244 of entity records 242 that match to the n-gram. The query understanding module 216 may also utilize a set of rules to determine an entity type of a recognized entity. The rules may take into account the context parameters 104 and/or other query terms in the search query 102. In this way, if a recognized entity has two or more different meanings, the query understanding module 216 may resolve this ambiguity. For example, if the search query 102 contains the following terms ("directions to jfk"). The entity JFK may be used as an airport code and also as an abbreviation of former United States president, John F. Kennedy. By considering the other terms and/or a geolocation of the user device 100, the query understanding module 312 may identify the entity as more likely corresponding to the airport interpretation as opposed to the person interpretation. The query understanding module 216 may further utilize a knowledge base to assist in making the determinations. The query understanding module 216 may also assign confidence scores to identified entities. The query understanding module 216 may output the entity ID (or a entity name with an entity type) of the entity having the highest confidence score.

At operation 314, the alternate query generation module 218 generates a set of alternate search queries based on the entity identified at operation 312. In some implementations, the alternate query generation module 218 queries a query lookup table 252 using the entity ID of the identified entity. The lookup table outputs a set of alternate search queries that correspond to the entity. The alternate query generation module 218 may alternatively query an inverted index that outputs a set of alternate search queries corresponding to the entities. In some implementations, the set of alternate queries includes app-specific search queries. Each app-specific search query specifies a software application, such that search results implicated by the app-specific search queries are limited to states of the specified software application. Additionally or alternatively, the alternate queries may be Boolean queries. Boolean queries may be narrower queries than natural language queries, as the Boolean queries may contain statements directed to specific types of data within an application state records. For example, a Boolean query may contain a statement directed to the text of the application state, a category of the application state, and/or a location of the subject of the application state.

In some implementations, the alternate query generation module 218 adds one or more constraints to the alternate search queries. The constraints may be location based constraints, time based constraints, and/or other suitable types of constraints. The alternate query generation module 218 may utilize a set of rules to add constraints to the alternate search queries. The rules may be entity type specific. In this way, a constraint may be added to an alternate search query only if the entity type lends itself to such a constraint. For example, a rule may stipulate that for entity types corresponding to brick and mortar establishments, location-based constraints may be suitable for constraining the search query 102, while entity types corresponding to electronic retail sites may not be suitable for location-based constraints. Furthermore, the rules may leverage a knowledge base to assist in determining the constraints. For instance, the rules may require the alternate query generation module 218 to determine whether a user is in an urban, suburban, or rural setting before determining the search radius (which is a location constraint). The alternate query generation module 218 may add the constraint(s) to each of the alternate queries in the set of alternate queries.

At operation 316, the set generation module 220 identifies a consideration set of application state records 262. The set generation module 220 searches the application state data store 260 to identify the consideration set of application state records 262. As previously stated, the consideration set of application state records may be comprised of function IDs 264, whereby each function ID indicates a corresponding application state record 262. In some implementations, the set generation module 220 queries an inverted index using the search query 102 and the alternate queries 124. The set generation module 220 may query the inverted index using the terms of the search query 102. Each application state record 262 identified by the inverted index may be included in the consideration set. The set generation module 220 also queries the index using the alternate search queries. In some of these implementations, the set generation module 220 may query the inverted index using the Boolean statements contained in the alternate search queries 124. For instance, the set generation module 220 may limit the query to application state records containing a particular application title. Furthermore, if the alternate search queries are constrained search queries, the set generation module 220 may filter the application state records 262 based on the constraints of the alternate search query. Put another way, if the information conveyed in the application state record 262 does not satisfy the constraints in the alternate search query 124, the application state record 262 is not included in the consideration set. In some implementations, the set generation module 220 performs multiple iterations when searching the application state data store 260. In the first iteration(s), the set generation module 220 may search the application state data store 260 using the search query 102 (or a constrained search query 122). In subsequent iterations, the set generation module 220 may search the application state data store 260 using the set of alternate search queries.

In this way, the set generation module 220 may filter out an application state record 262 from the consideration set when the constraints in the alternate search queries 124 are not met by the application state record 262 only if the search query 102 did not previously implicate the application state record 262.

At operation 318, the set generation module 220 scores the application state records 262 in the consideration set. For each application state record 262, the set generation module 220 can generate a feature vector corresponding to the application state record 262. The feature vector may include query scoring features, record scoring features, and/or query/record scoring features. The set generation module 220 may feed each feature vector to the machine learned scoring model, which outputs a result score of the corresponding application state record 262.

At operation 320, the results processing module 222 generates the search results 130 based on the scored application state records 262. The results processing module 222 may rank the application state records 262 based on their respective result scores. The results processing module 222 may select application state records 262 to include in the search results 130 based on their respective ranking (e.g., the top M records 262) or the value of the result score (e.g., records 262 having a score above a threshold). For each application state record 262 to be included in the search results 130, the results processing module 22 may generate a result object 132 based on the application state record 262 and a result object template. The results processing module 222 may include the generated result objects 132 in a container (e.g., a JSON file or XML file) thereby generating the search results 130. At operation 322, the results processing module 222 can transmit the search results 130 to the user device 100.

The method 300 of FIG. 3 may include additional and/or alternate operations. For instance, the search system 300 may generate a constrained search query 122 based on the search query 102 and the context parameters 104. In these implementations, the consideration set may further be based on the constrained search query 122.

Figure 4:
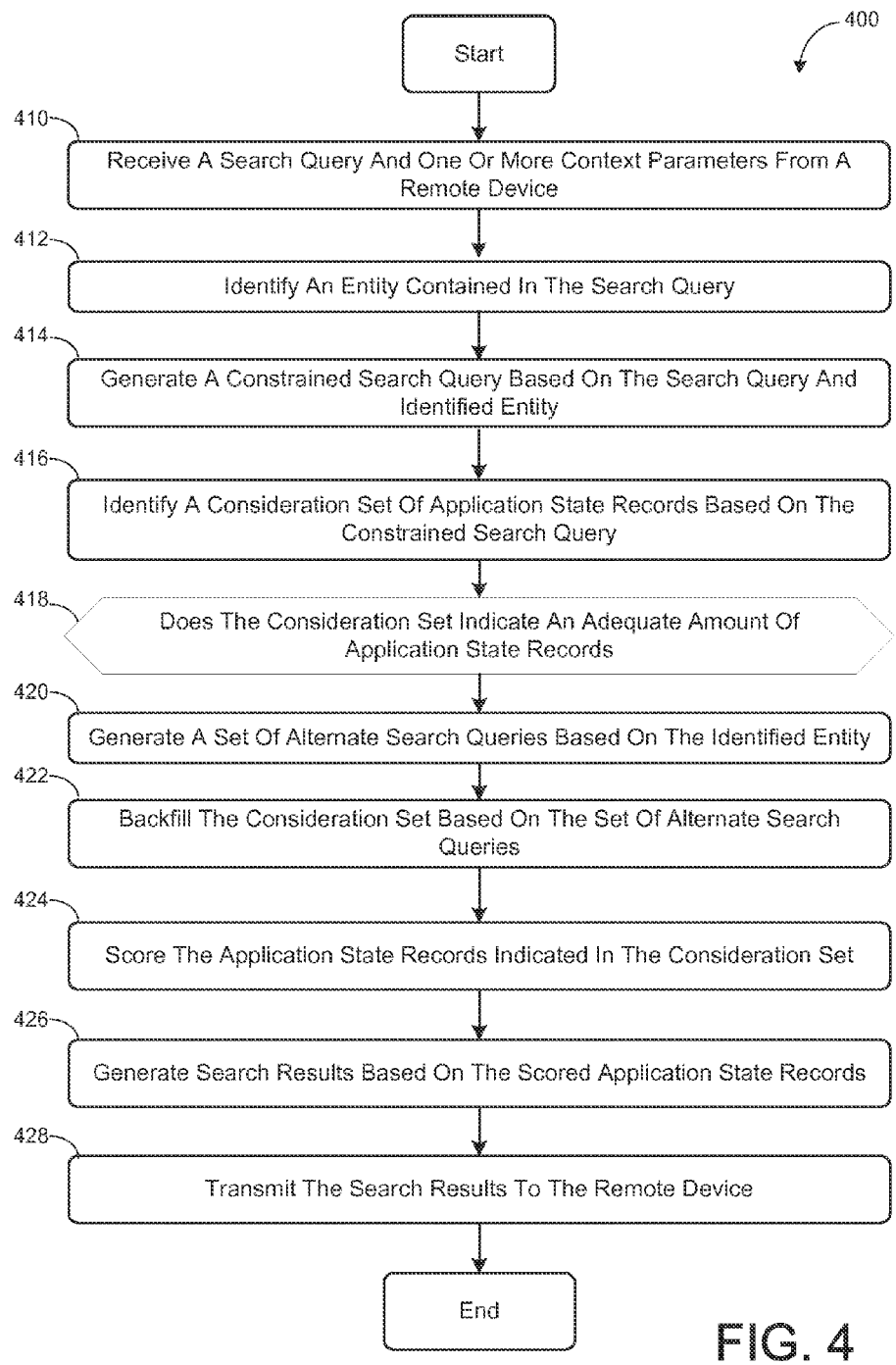

FIG. 4 illustrates a set of operations of a method 400 for responding to a search query 102. In the method 400 of FIG. 4, the search system 200 is configured to perform an initial search using a constrained search query 122 and to backfill the search results using a set of alternate search queries when the search results 130 identified using the constrained search query 122 are inadequate.

At operation 410, the search system 200 receives a search query 102 and one or more context parameters 104. As previously discussed, the search query 102 and context parameters 104 may be contained in a query wrapper 106. At operation 412, the query understanding module 216 identifies an entity contained in the search query 102. The query understanding module 216 can search the entity data store 240 to identify the entity. In the case that the search query 102 contains an ambiguous entity name, the query understanding module 216 may use the context parameters 104 and/or other terms in the search query 102 to resolve the ambiguity.

At operation 414, the query understanding module 216 generates a constrained search query 122. The query understanding module 216 may utilize one or more rules to determine constraints for the search query 102. The query understanding module 216 may determine which rule(s) to use to determine the constraint(s) based on the entity type of the identified entity. The query understanding module 216 utilizes a selected rule to determine the constraint(s). The rule may instruct the query understanding module 216 to determine the constraint(s) given the context parameters 104 and/or the query terms of the search query 102. The query understanding module 216 may add the determined constraints to the search query 102, thereby obtaining the constrained search query 122.

At operation 416, the set generation module 220 searches the application state data store 262 based on the constrained search query 122. The set generation module 220 may query an inverted index using the constrained search query 122. The set generation module 220 can utilize the query terms in the constrained search query 122 (e.g., the terms in the search query 102) to determine the application state records 262 that have at least one keyword in common with the constrained search query 122. The set generation module 220 can include the identified application state records 262 in a consideration set. The set generation module 220 can filter the application state records 262 based on the constraints of the constrained search query 122. The set generation module 220 can filter out any application state records 262 that do not meet the constraints in the constrained search query 122.

At operation 418, the set generation module 220 determines whether the consideration set includes a sufficient number of application state records 262 (e.g., more than two records 262). In the case where the consideration set does not include a sufficient number of application state records 262, the set generation module 220 instructs the alternate query generation module 218 to generate a set of alternate search queries 124. Otherwise, the set generation module 220 may continue to operation 424.

At operation 420, the alternate query generation module 218 generates a set of alternate search queries 124. The alternate query generation module 218 utilizes the entity identified at operation 412 and the constrained search query 122 to generate the set of alternate search queries. In some implementations, the alternate query generation module 218 looks up a set of alternate search queries using the identified entity. For example, the alternate query generation module 218 may query the query lookup table 252 using the identified entity. The query lookup table returns an unconstrained set of alternate search queries 124. The alternate query generation module 218 may constrain the alternate search queries 124 with the constraint(s) in the constrained search query 122.

At operation 422, the set generation module 220 backfills the consideration set using the set of alternate search queries 124. The set generation module 220 can backfill the consideration set by searching the application state data store 260 using the alternate search queries. The set generation module 220 can query an inverted index using the terms contained in the alternate search queries. The set generation module 220 may filter the output of the inverted index using the constraints in the alternate search queries. The application state records 262 that are identified by the set generation module 220 and that satisfy the constraints are included in the consideration set.

At operation 424, the set generation module 220 scores the application state records in the consideration set. For each application state record 262, the set generation module 220 can generate a feature vector corresponding to the application state record 262. The feature vector may include query scoring features, record scoring features, and query/record scoring features. The set generation module 220 may feed each feature vector to the machine learned scoring model, which outputs a result score of the corresponding application state record 262.

At operation 426, the results processing module 222 generates the search results 130 based on the scored application state records 262. The results processing module 222 may rank the application state records 262 based on their respective result scores. The results processing module 222 may select application state records 262 to include in the search results 130 based on their respective ranking (e.g., the top M records 262) or the value of the result score (e.g., records 262 having a score above a threshold). For each application state record 262 to be included in the search results 130, the results processing module 22 may generate a result object 132 based on the application state record 262 and a result object template. The results processing module 222 may include the generated result objects 132 in a container (e.g., a JSON file or XML file) thereby generating the search results 130. At operation 428, the results processing module 222 can transmit the search results 130 to the user device 100.

The method 400 of FIG. 4 is provided for example only. Variations of the method 400 are within the scope of the disclosure.

Referring back to FIG. 2B, the content acquisition module 214 is configured to generate the sets of alternate search queries. The content acquisition module 214 may be assigned a set of entities (e.g., entity IDs). For each entity, the content acquisition module 214 generates a set of alternate search queries. The set of entities may be manually curated or may be read in from the entity data store 240.

Figure 5:
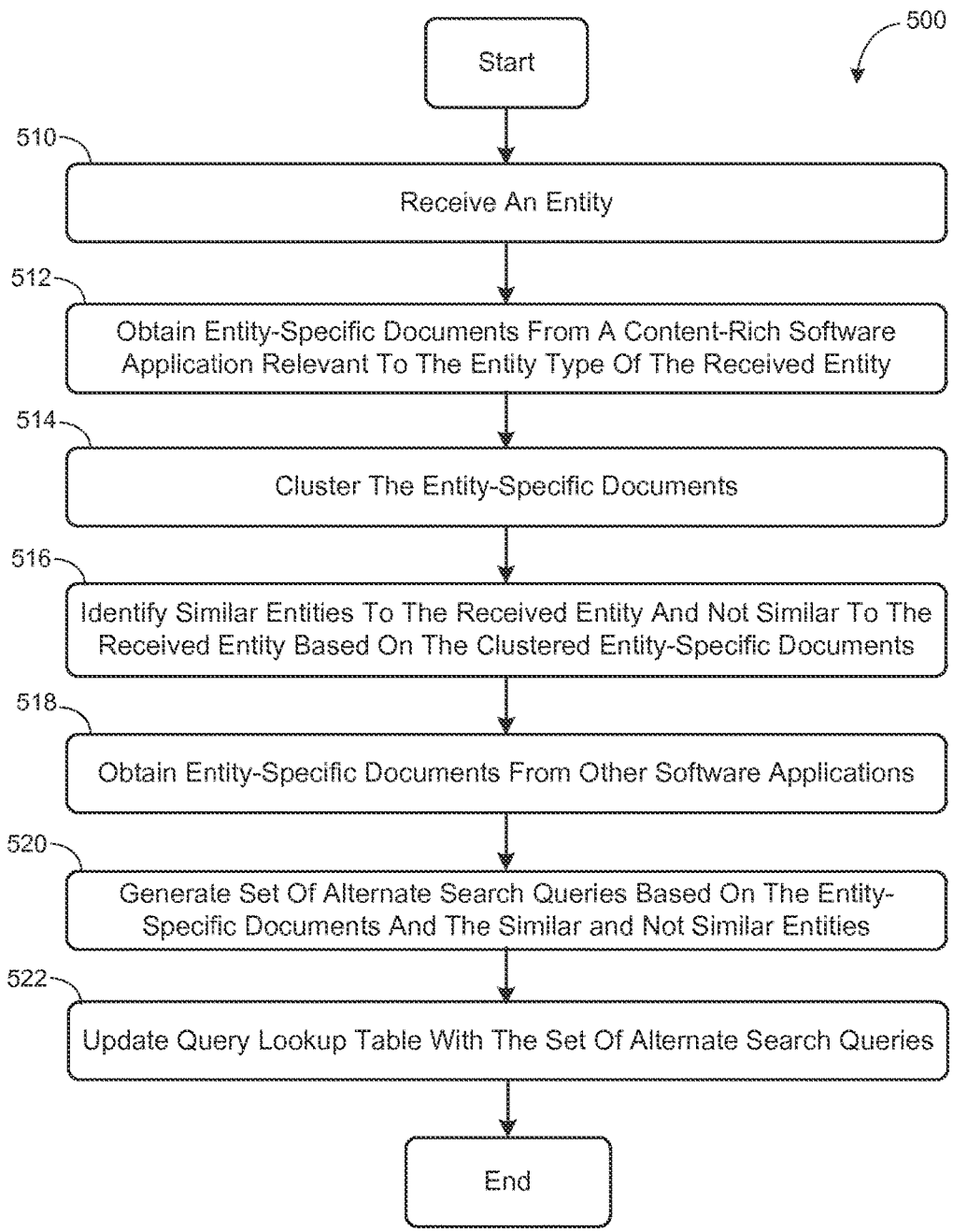

In some implementations, the content acquisition module 214 leverages data obtained from other software applications to determine the set of alternate search queries. FIG. 5 illustrates an example set of operations of a method 500 for generating a set of alternate search queries for an entity. The method 500 may be repeated for other entities.

At operation 510, the content acquisition module 214 receives an entity. The entity may be represented by an entity ID. At operation 512, the content acquisition module 214 obtains entity-specific documents from a content-rich software application relevant to the entity type of the received entity. The content-rich software application may be a software application that is identified as having high quality content with relatively good coverage. The content-rich software application may be manually selected and may be specific to specific verticals. For instance, IMDB® may be manually selected for movie entities, television show entities, actor entities and the like. Similarly, YELP® may be manually selected for restaurant entities. The content acquisition module 214 can lookup the content-rich software application based on the entity type of the received entity. The content acquisition module 214 can then obtain the documents 160. In some scenarios, the content acquisition module 214 may crawl the content-rich software application. The content acquisition module 214 may begin with a seed URL and may crawl the software application, iteratively requesting and scraping documents 160. The documents 160 are referred to as entity-specific documents 160. In this way, the document 160 (e.g., a state of the software application) describes or otherwise corresponds to a specific entity. For example, the document may be a review page of a restaurant or a Wikipedia article about a particular subject. In some scenarios, the entity specific documents may have been previously crawled and thus, may be retrieved from memory (e.g., the storage system 230).

At operation 514, the content acquisition module 214 clusters the obtained documents 160. The content acquisition module 214 may utilize any suitable clustering technique, including bi-clustering, tri-clustering, k-means clustering, or the like. Documents may be clustered using any standard features, such as keywords, LSI (Latent Semantic Indexing), source-specific structured fields, such as "category" or "price", etc. Additionally or alternatively, the features on which the documents are clustered by may be hand-curated. For example, for documents from YELP®, the documents 160 may be clustered on category, description, rating, and price. At operation 516, the content acquisition module 214 identifies similar entities to the received entities and not similar entities to the received entity based on the clustered documents 160. In some implementations, the content acquisition module 214 treats entities described in the documents 160 in the same cluster as the documents 160 describing the received entity as similar entities. Entities described in documents in other clusters are not similar entities.

At operation 518, the content acquisition module 214 obtains entity-specific documents from other software applications. The content acquisition module 214 may crawl a set of other software applications that are similar to the content-rich software application. For example, the other software applications may be software applications in a similar vertical as the content-rich software application. The content acquisition module 214 can request documents 160 relating to the entities described in the documents obtained at operation 312. In some scenarios, the other software applications may have been previously crawled. In such a scenario, the content acquisition module 214 may obtain the documents from memory (e.g., the storage system 230).

At operation 520, the content acquisition module 214 determines a set of alternate search queries based for the received entity. In the case that the alternate search queries are app-specific search queries, the content acquisition module 214 can group the documents 160 according to software application (i.e., documents 160 are grouped with other documents 160 from the same software application). For each group, the content acquisition module 214 separates the documents into two "piles." The first pile contains documents 160 pertaining to the received entity and the entities that are similar to the retrieved entity and the second pile contains the documents 160 pertaining to the not similar entities. The content acquisition module 214 can then determine the features that are prevalent in the documents in the first pile but not in the second pile. The content acquisition module 214 may use any suitable feature extraction technique to identify the features, such as principal component analysis, Chi-Squared, entropy-based feature analysis or any other method to identify good positive or negative features. Given a set of positive and negative features, a query can be created. Alternately, a machine learned model can be trained and the learned model could be projected to define a set of selected features or a user query. (See, for example: Gary Flake, Eric Glover, Steve Lawrence, C. Lee Giles: Extracting Query Modifications from Nonlinear SVMs, Proceedings of the Eleventh International World Wide Web Conference, May 2002). The result of the feature extraction is the set of features that are prevalent in documents 160 corresponding to entities that are similar to the received entity. The extracted features may be represented in Boolean statements. For example, if the software application is the example "Maps App" and the extracted features include "category=fast food" and "description=burger OR hamburger," the content acquisition module 214 can convert these into Boolean statements (Application="Maps App" & category="fast food" & description=("burger" OR "hamburger")). The following may be one app-specific search query. It is noted that the content acquisition module 214 may generate more than one app-specific search query per software application for the received entity. Furthermore, the content acquisition module 214 may generate app-specific alternate search queries for multiple software applications, whereby each software application is represented by a set of documents 160 retrieved from the software application. The collection of generated app-specific search queries may be combined into a single set and related to the received entity. At operation 522, the content acquisition module 214 updates the query lookup table 252 with the entity and the corresponding set of app-specific alternate search queries.

The method of FIG. 5 is provided for example only. The method 500 may be varied. For example, instead of or in addition to generating app-specific alternate search queries, the content acquisition module 214 may generate generic alternate search queries. In these implementations, the content acquisition module 214 does not group the documents according to software application before separating the documents into piles. In this way, when the feature extraction is performed the features are extracted from documents 160 across multiple applications. Furthermore, the foregoing techniques are only one possible way to determine the alternate search queries.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of data processing apparatus. The computer readable medium can be a machine-readable storage device, a machine-readable storage substrate, a memory device, a composition of matter effecting a machine-readable propagated signal, or a combination of one or more of them. The terms "data processing apparatus," "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
   receiving, by at least one processor, a search query containing at least one query term from a remote device;
   identifying, by the at least one processor, an entity in the search query, the entity being a known entity name of a known entity type;
   generating, by the at least one processor, a set of alternate search queries based on the entity, the alternate search queries being configured to identify states of applications that correspond to entities that are substitutes for the entity;
   identifying, by the at least one processor, a consideration set of application state records stored in an application state data store based on the set of alternate search queries, each application state record defining a state of a respective application that is at least relevant to at least one of the alternate search queries;
   generating, by the at least one processor, search results based on the consideration set; and
   transmitting, by the at least one processor, the search results to the remote device,
   wherein the set of alternate search queries is generated by:
      obtaining, by the at least one processor, a first set of documents by crawling at least one application,
      separating, by the at least one processor, the first set of documents into first and second subsets, the first subset containing documents relating to the entity or related entities and the second subset containing documents not related to the entity or the related entities,
      extracting, by the at least one processor, at least one feature that differentiates the documents in the first subset and the documents in the second subset, and
      generating, by the at least one processor, the set of alternate search queries based on the at least one extracted feature.

2. The method of claim 1, wherein generating the set of alternate search queries includes:
   querying a query lookup table with an entity ID of the entity or a combination of an entity name of the entity and an entity type indicating a classification of the identified entity; and
   receiving the set of alternate search queries from the query lookup table.

3. The method of claim 2, wherein generating the set of alternate search queries further includes:
   determining one or more query constraints based on the entity type and one or more context parameters received with the search query; and
   adding the constraints to each of the set of alternate search queries.

4. The method of claim 1,
   wherein at least a subset of the set of alternate search queries are application-specific search queries, and wherein an application-specific search query is constrained to application state records corresponding to a single application.

5. The method of claim 1 further comprising:
determining, by the at least one processor, a constraint rule from a plurality of constraint rules based on an entity type of the identified entity;
determining, by the at least one processor, a location constraint for the search query based on the constraint rule and a location of a user device that transmitted the search query; and
generating, by the at least one processor, a constrained search query based on the location constraint and the search query, wherein the consideration set if further identified based on the constrained search query.

6. The method of claim 5, wherein identifying the consideration set includes:
querying a search index based on the constrained search query, the search index identifying zero or more application state records that are relevant to the constrained search query;
determining whether a number of application state records identified by the search index exceeds a threshold; and
when the number of application state records does not exceed the threshold, querying the search index based on the set of alternate search queries.

7. The method of claim 1, wherein the set of alternate search queries is learned off line and is stored in relation to an entity identifier of the entity in an alternate query data store.

8. The method of claim 1, wherein the set of alternate search queries is generated by:
obtaining a second set of documents, by the at least one processor, by crawling a content rich application;
clustering, by the at least one processor, the second set of documents into a plurality of groups based on features defined in the documents;
identifying, by the at least one processor, a group of documents from the plurality of groups that contains a document corresponding to the entity;
identifying, by the at least one processor, other entities referenced by other documents in the group of documents to obtain the related entities;
obtaining the first set of documents, by the at least one processor, by crawling at least one other application;
separating, by the at least one processor, the first set of documents into the first and second subsets;
extracting, by the at least one processor, the at least one feature that differentiates the documents in the first subset and the documents in the second subset; and
generating, by the at least one processor, the set of alternate search queries based on the at least one extracted feature.

9. The method of claim 1 wherein the remote device is a user device on which the search query was provided.

10. A search system comprising:
a network interface;
at least one storage device, the at least one storage device storing:
an application state data store that stores a plurality of application state records, each application state record defining a state of a respective application; and
an alternate query data store that stores a query lookup table, the query lookup table respectively relating entities to a corresponding set of alternate search queries, each set of alternate search queries corresponding to a respective entity and being configured to identify states of applications that correspond to entities that are substitutes for the corresponding entity; and
at least one processor that executes computer-readable instructions, the computer-readable instructions causing the at least one processor to:
receive a search query containing at least one query term from a remote device via the network interface;
identify an entity in the search query, the entity being a known entity name of a known entity type;
generate a set of alternate search queries based on the entity;
identify a consideration set of application state records based on the set of alternate search queries;
generate search results based on the consideration set; and
transmit the search results to the remote device,
wherein the set of alternate search queries is generated by:
obtaining a first set of documents by crawling at least one application,
separating the first set of documents into first and second subsets, the first subset containing documents relating to the entity or related entities and the second subset containing documents not related to the entity or the related entities,
extracting at least one feature that differentiate the documents in the first subset and the documents in the second subset, and
generating the set of alternate search queries based on the at least one extracted feature.

11. The search system of claim 10, wherein generating the set of alternate search queries includes:
querying the query lookup table with an entity ID of the entity or a combination of an entity name of the entity and an entity type indicating a classification of the identified entity; and
receiving the set of alternate search queries from the query lookup table.

12. The search system of claim 11, wherein generating the set of alternate search queries further includes:
determining at least one query constraint based on the entity type; and
adding the at least one query constraint to each of the set of alternate search queries.

13. The search system of claim 10,
wherein at least a subset of the set of alternate search queries are application-specific search queries, and
wherein an application-specific search query is constrained to application state records corresponding to a single application.

14. The search system of claim 10 wherein the computer-readable instructions further cause the at least one processor to:
determine a constraint rule from a plurality of constraint rules based on an entity type of the identified entity;
determine a location constraint for the search query based on the constraint rule and a location of a user device that transmitted the search query; and
generate a constrained search query based on the location constraint and the search query, wherein the consideration set if further identified based on the constrained search query.

15. The search system of claim 14, wherein identifying the consideration set includes:

querying a search index based on the constrained search query, the search index identifying zero or more application state records that are relevant to the constrained search query;

determining whether a number of application state records identified by the search index exceeds a threshold; and when the number of application state records does not exceed the threshold, querying the search index based on the set of alternate search queries.

16. The search system of claim 10, wherein the set of alternate search queries are learned off line.

17. The search system of claim 16, wherein the set of alternate search queries is generated by:

obtaining a second set of documents by crawling a content rich application;

clustering the second set of documents into a plurality of groups based on features defined in the documents;

identifying a group of documents from the plurality of groups that contains a document corresponding to the entity;

identifying other entities referenced by other documents in the group of documents to obtain the related entities;

obtaining the first set of documents by crawling at least one other application;

separating the first set of documents into the first and second subsets;

extracting at least one feature that differentiates the documents in the first subset and the documents in the second subset; and generating the set of alternate search queries based on the at least one extracted feature.

* * * * *